United States Patent
Epperlein et al.

(10) Patent No.: US 11,145,052 B2
(45) Date of Patent: Oct. 12, 2021

(54) INTELLIGENT CLASSIFICATION OF REGIONS OF INTEREST OF AN ORGANISM FROM MULTISPECTRAL VIDEO STREAMS USING PERFUSION MODELS

(71) Applicants: INTERNATIONAL BUSINESS MACHINES CORPORATION, Armonk, NY (US); UNIVERSITY COLLEGE DUBLIN SCHOOL OF MEDICINE & MEDICAL SCIENCE, Dublin (IE)

(72) Inventors: Jonathan Epperlein, Dublin (IE); Sergiy Zhuk, Dublin (IE); Rahul Nair, Dublin (IE); Pol MacAonghusa, County Kildare (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 265 days.

(21) Appl. No.: 16/394,596

(22) Filed: Apr. 25, 2019

(65) Prior Publication Data
US 2020/0342587 A1    Oct. 29, 2020

(51) Int. Cl.
*G06T 7/00* (2017.01)
*G06K 9/32* (2006.01)
*G06N 20/00* (2019.01)
*G06K 9/62* (2006.01)

(52) U.S. Cl.
CPC .......... *G06T 7/0012* (2013.01); *G06K 9/3233* (2013.01); *G06K 9/6267* (2013.01); *G06N 20/00* (2019.01); *G06T 2207/10036* (2013.01)

(58) Field of Classification Search
CPC ........ G06T 7/0012; G06T 2207/10036; G06T 2207/30096; G06T 2207/20084; G06T 2207/10024; G06T 2207/10064; G06T 7/0016; G06K 9/3233; G06K 9/6267; G06N 20/00
See application file for complete search history.

(56) References Cited

U.S. PATENT DOCUMENTS

| 9,892,513 | B2 | 2/2018 | Gurevich et al. | |
| 2016/0035093 | A1* | 2/2016 | Kateb | G02B 23/24 382/131 |
| 2017/0084024 | A1 | 3/2017 | Gurevich | |
| 2017/0367580 | A1* | 12/2017 | DiMaio | A61B 5/445 |

(Continued)

OTHER PUBLICATIONS

P. Valdes et al. "Optical technologies for intraoperative neurosurgical guidance." Neurosurgical Focus, vol. 40, 3, 2016: E8. doi:10.3171/2015.12.FOCUS15550. (35 Pages).

(Continued)

*Primary Examiner* — Phuoc Tran
(74) *Attorney, Agent, or Firm* — Griffiths & Seaton PLLC

(57) ABSTRACT

Embodiments for implementing intelligent classification of region of interest in an organism in a computing environment by a processor. Time series data of a contrast agent in one or more regions of interest captured from multispectral image streams may be collected. The one or more regions of interest may be classified into one of a plurality of classes by applying one or more perfusion models, representing spatio-temporal behavior of the contrast agent reflected by the time series data, and by using a machine learning operation.

20 Claims, 9 Drawing Sheets

(56) References Cited

U.S. PATENT DOCUMENTS

2018/0028079 A1 2/2018 Gurevich et al.
2020/0193597 A1* 6/2020 Fan .................... G16H 50/20

OTHER PUBLICATIONS

J. Thatcher et al., "Imaging Techniques for Clinical Burn Assessment with a Focus on Multispectral Imaging," Advances in Wound Care, vol. 5, No. 8, pp. 360-378, 2016.
H. Khokhar, et al., "Illuminating neoplasia with systemic indocyanine green and near-infrared endoscopic system—clinical experience (AB027. 172)." Mesentery and Peritoneum, vol. 2, No. 2, 2018, http://map.amegroups.com/article/view/4036.
M. Gurfinkel et al., "Pharmacokinetics of ICG and HPPH-car for the Detection of Normal and Tumor Tissue Using Fluorescence, Near-infrared Reflectance Imaging: A Case Study." Photochemistry and Photobiology, vol. 72, No. 1, Jul. 2000, pp. 94-102.
J. Epperlein and S. Zhuk, "Biophysics-Inspired AI Uses Photons to Help Surgeons Identify Cancer." Feb. 28, 2019. [Accessed Apr. 18, 2019] https://www.ibm.com/blogs/research/2019/02/biophysics-inspired-ai/. (3 Pages).
IBM Research Blog: Biophysics-Inspired AI Uses Photons to Help Surgeons Identify Cancer, Feb. 2019.

* cited by examiner

INTELLIGENT CLASSIFICATION OF REGIONS OF INTEREST OF AN ORGANISM FROM MULTISPECTRAL VIDEO STREAMS USING PERFUSION MODELS

BACKGROUND OF THE INVENTION

Field of the Invention

The present invention relates in general to computing systems, and more particularly, to various embodiments for intelligent classification of regions of interest in an organism using models of perfusion from time series data captured from multispectral video streams using a computing processor.

Description of the Related Art

In today's society, consumers, business persons, health care professionals, and others use various computing systems with increasing frequency in a variety of settings. The prevalence of health problems presents a challenge for computing systems to detect and assist in proper diagnosis of various types of diseases. Current methods of computer assisted diagnosis of a patient's condition involve a combination of different types of analyses performed on clinical, molecular (genomic, proteomic, metabolic, etc.) and environmental data. For some complex cases, timely detection and proper diagnosis of a disease is critical and imperative to managing, containing, preventing, or even eradicating the disease.

SUMMARY OF THE INVENTION

Various embodiments for implementing intelligent classification of region of interest in an organism captured from multispectral video streams by a processor, are provided. In one embodiment, by way of example only, a method for implementing intelligent classification of regions of interest in an organism (e.g., tissue in a patient), again by a processor, is provided. Time series data of a contrast agent (e.g., a fluorescent dye) in one or more regions of interest captured from multispectral image streams may be collected. The one or more regions of interest may be classified into one of a plurality of classes by estimating parameters of one or more perfusion models representing spatio-temporal behavior of the contrast agent during the time series data using a machine learning operation.

One or more solutions are provided for implementing intelligent classification of region of interest in an organism by automating the process of assessing tissue based on the perfusive properties of the tissue having a contrast agent administered therein. As another added feature and advantage over the current state of the art, is by implementing an intelligent classification of region of interest in an organism and providing real-time tracking of regions of tissue of an organism in multispectral videos.

One or more solutions are provided for capturing (in real-time) multispectral image video streams using an image capturing device of the one or more regions of interest of an organism for a selected period of time, collecting user profile data, and/or collecting a corpus of labels for labeling the multispectral image/video streams. The intelligent classification of region of interest in an organism provides an advantage by labeling the regions of interest of the organism as a specific class in the multispectral image video streams. Each class represents at least a predicted medical diagnosis of the region of interest (e.g., diagnosis of healthy or unhealthy tissue in human). In this way, the behavior of the regions of interests may be tracked and classified on a time-scale of seconds (or less) without relying on the previous human observation requirement of waiting over a lengthy period of time (e.g., hours) to reach a stationary phase where a contrasting agent is completely persisted or washed out of the tissue or obtaining results from a medical procedure (e.g., a biopsy).

Another advantage provided by the embodiments is assigning a confidence score to the classes of the labeled regions of interest. Also, intelligent classification of region of interest in an organism provides an advantage by identify an illumination intensity level of the contrast agent captured from the multispectral image stream. The spatio-temporal behavior includes the illumination intensity level and the illumination intensity level represents a concentration level of the contrast agent in the one or more regions of interest. One or more solutions are provided to initiate a machine learning to perform one or more machine learning operations to train or retrain the one or more perfusion models according to a repository of plurality of multispectral image streams, a corpus of labels of each of the plurality of multispectral image streams, a plurality of time series data, labeled regions of interest, patient profile data, or a combination thereof.

As another added feature and advantage over the current state of the art, is classifying regions of tissue captured in multispectral video stream(s) into medically meaningful classes using a classifier. The classifier may be generated and/or enhanced from a dataset of such multispectral video streams and labeled with medically meaningful label/diagnosis.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
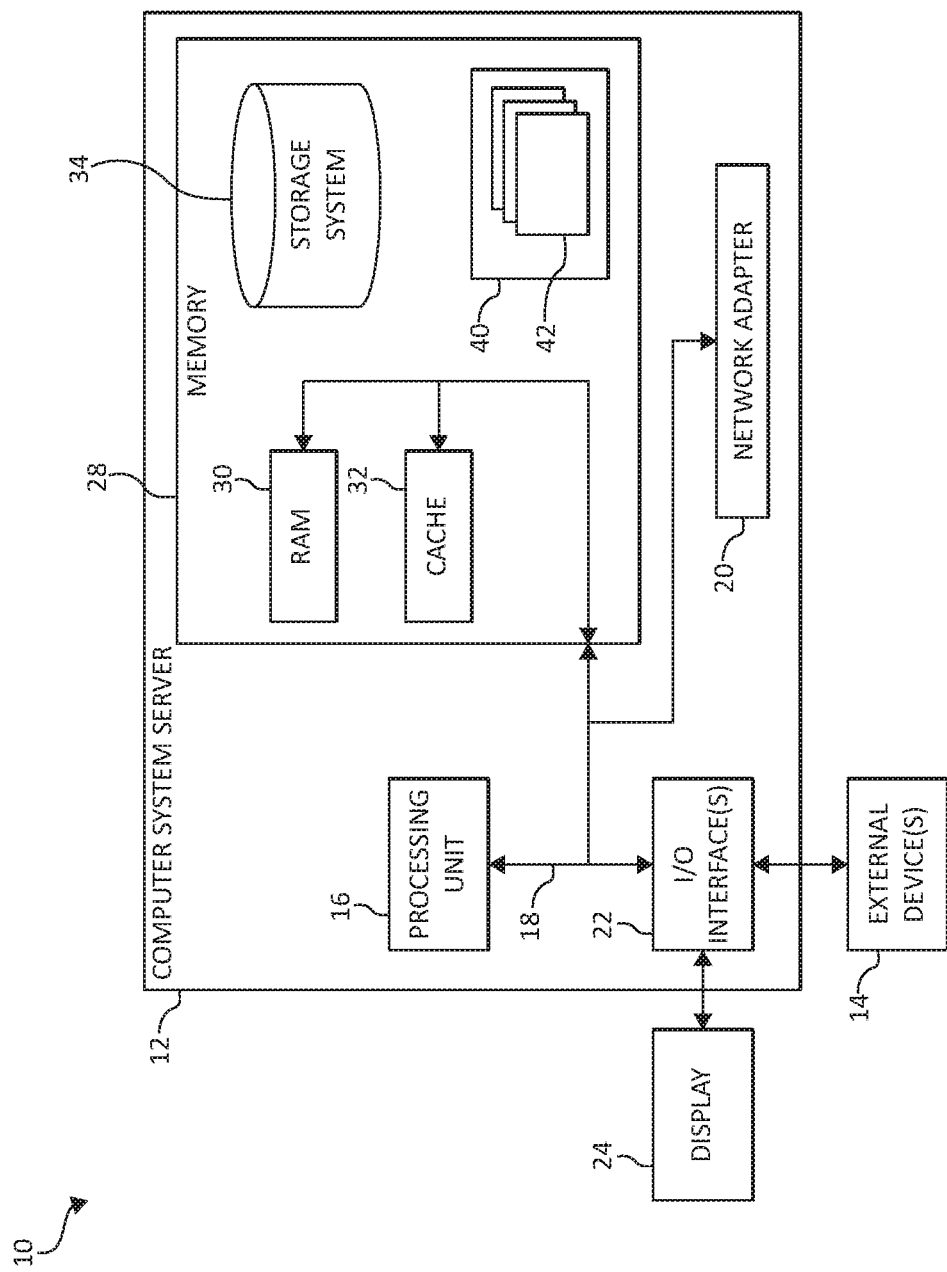
FIG. 1 is a block diagram depicting an exemplary cloud computing node according to an embodiment of the present invention.

Certain types of biological tissue of an organism such as for example, cancerous tissue in a human, differs from healthy tissue in many ways, the most obvious being that medical intervention seeks to eradicate every last bit of the unhealthy tissue while preserving as much as possible of the healthy tissue. Some unhealthy tissue (e.g., cancerous tissue) grows its own blood supply, which is typically chaotic and leaky; this process is called angiogenesis. The resulting difference in blood flow patterns can be used to detect and potentially delineate cancer.

A contrast agent such as, for example, a fluorescent dye is used in many surgical domains in the following way: the dye is administered to the patient and transported through the body via the blood stream ("perfusion"). The presence of the contrast agent (e.g., the fluorescent dye) in a segment of tissue leads to fluorescence: if light at a certain wavelength is shone onto the tissue, light at a certain different wavelength is emitted from the tissue. The fluorescence offers a non-invasive way of detecting presence or absence of the contrast agent (e.g., the fluorescent dye) in tissues of interest. This offers information to a medical expert (e.g., cancerous tissue retains dye much longer than healthy tissue does such as, for example, up to hours as compared to 15-20 minutes). However, assessment of the information contained in the increase and decrease of fluorescence intensity is subjective and qualitative.

Additionally, infrared cameras can be used to quantify the differences in blood perfusion, which is the passage of blood through the vascular system to tissues. For example, it may be observed that uptake and release of the contrast agent (e.g., the fluorescent dye) is faster or slower in healthy tissue than in cancerous tissue, potentially due to chaotic and leaky capillaries. However, current clinical usage of the contrast agent (e.g., the fluorescent dye) to guide decision-making is limited to human observation of a long, almost stationary phase during which the contrast agent (e.g., the fluorescent dye) persists in the cancer but has been washed out from the healthy tissue. This is because it is challenging even for very experienced domain experts (e.g., medical surgeons) to identify which regions of tissue of an organisms were perfused early and sufficient, which were not perfused and insufficient, and which retained the contrast agent (e.g., the fluorescent dye) longer than other sections of the biological tissue.

Thus, an objective, quantitative way of extracting information contained in fluorescence profiles is to (1) inform the decision making of medical experts, (2) improve individual decision making by giving access to decision making of an expert community, and (3) enable (semi-)automation of surgical intervention. Thus, the present invention provides for implementing intelligent classification of region of interest in an organism by automating the process of assessing tissue based on the perfusive properties of the tissue.

In one aspect, time series data of a contrast agent in one or more regions of interest captured from multispectral image streams may be collected. The one or more regions of interest may be classified into one of a plurality of classes by applying one or more perfusion models to one or more estimated perfusion parameters representing spatio-temporal behavior of the contrast agent during the time series data using a machine learning operation.

As will be further described, the present invention provides one or more advantages and benefits domain expert or other user by classifying regions of tissue into medically meaningful classes based on the perfusive properties of the tissue captured in multispectral video stream(s). In this way, the present invention provides added features and benefits over the current state of the art where current clinical usage of the contrast agent (e.g., a fluorescent dye) is limited to human observation of the time consuming stationary phase during which the contrast agent persists in one target region of tissue (e.g., cancerous tissue region) but has been washed out from another target region of tissue (e.g., a healthy tissue region).

The present invention generates or enhances/retrains a classifier from a dataset of a repository of multispectral video streams labeled with medically meaningful labels. The invention employs real-time tracking of one or more regions of tissue using multispectral videos. The tracking, in particular, provides robust estimates of the spatio-temporal behavior of a contrast agent in the region of interest (e.g., living tissue of an organism) obtained from the time series data captured from the multispectral video streams. The resulting estimates of spatio-temporal behaviors of a contrast agent are used to learn/train a biophysical model or models of perfusion dynamics via one or more suitable parameter estimation operation. One or more operations are provided to estimate parameters of bio-physical models of a contrast agent transport and fluorescence in tissue and to employ the estimated parameters to design biophysically meaningful feature space for subsequent machine learning/classification operations.

Thus, the present invention is not based on human observation and hence provides added features and benefits over the current state of the art by enabling less experienced domain experts (e.g., surgeons) to quickly (e.g., within seconds) make decisions based on the knowledge of many experts using the present invention for accurate medical diagnosis and guidance. Finely meshed assessments can be used to delineate unhealthy tissue of an organism (e.g., cancerous tissue) to further guide resection decisions. If the assessments of such output results provided by mechanisms of the illustrated embodiments with a provided confident confidence score greater than a selected threshold, biopsies and pathologist evaluation can be skipped, delayed, and/or used as secondary confirmation. Thus, by the mechanisms of the illustrated embodiments provide a real-time output (e.g., medical diagnosis within seconds). The present invention enables a "robotic surgeon" to resect tissue, which is classified as unhealthy tissue (e.g., cancerous), requiring surgeons to supervise, but not to perform the operation directly.

In one aspect, as used herein, the present invention provides for perfusion modelling, i.e., the generation of mathematical models describing the passage of blood through the vascular system to tissues. Various models can be used in this context, such as spatially concentrated compartment models, spatially distributed models of advection and diffusion, etc. In yet another aspect, as used herein, the parameters of such perfusion models can be used by machine learning models, such as decision trees, artificial neural networks, support vector machines, k-nearest neighbor, etc. A machine learning model can use a ground truth set (i.e., a data set comprising members of a known classification) to train a classifier to automatically classify unknown members of an input data set.

Thus, the present invention provides added features and benefits over the current state of the art by providing novel computational tools to extract information encoded in the dynamic behavior of contrast agents (e.g., fluorescent dyes) from real-time video feeds collected during surgery from Clinical Imaging Systems ("CIS"), using biophysical models of perfusion and photon diffusion in biological tissues, and to use this information in biophysics-based artificial intelligence "AI" tools to support domain experts' (e.g., surgeon) decisions. This information provided by the illustrated embodiments are be made available to the domain expert during an operation surgery through an Augmented Reality (AR) view, which would overlay it on the real-time feed from a CIS. Such Augmented Reality for Surgeons (ARS) decision-support systems may support human judgement by combining features visible and interpretable by a skilled human (e.g., shape, color, and mechanical properties of the tissue) with information that can be revealed only by computer analysis (e.g., subtle changes and differences in textures, and perfusion properties estimated from dye inflow, uptake, release, and outflow). That is, as described herein, such biophysics-based AI techniques would enable a richer amount of information and, ultimately, a building of a 3D surgical heat map displaying areas of suspected malignant growth. An ARS systems may then be used to support intraoperative decisions of domain experts (e.g., surgeon), including those with less experience, by providing them with direct access to relevant collective domain expert knowledge.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities, but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16 (which may be referred to herein individually and/or collectively as "processor"), a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
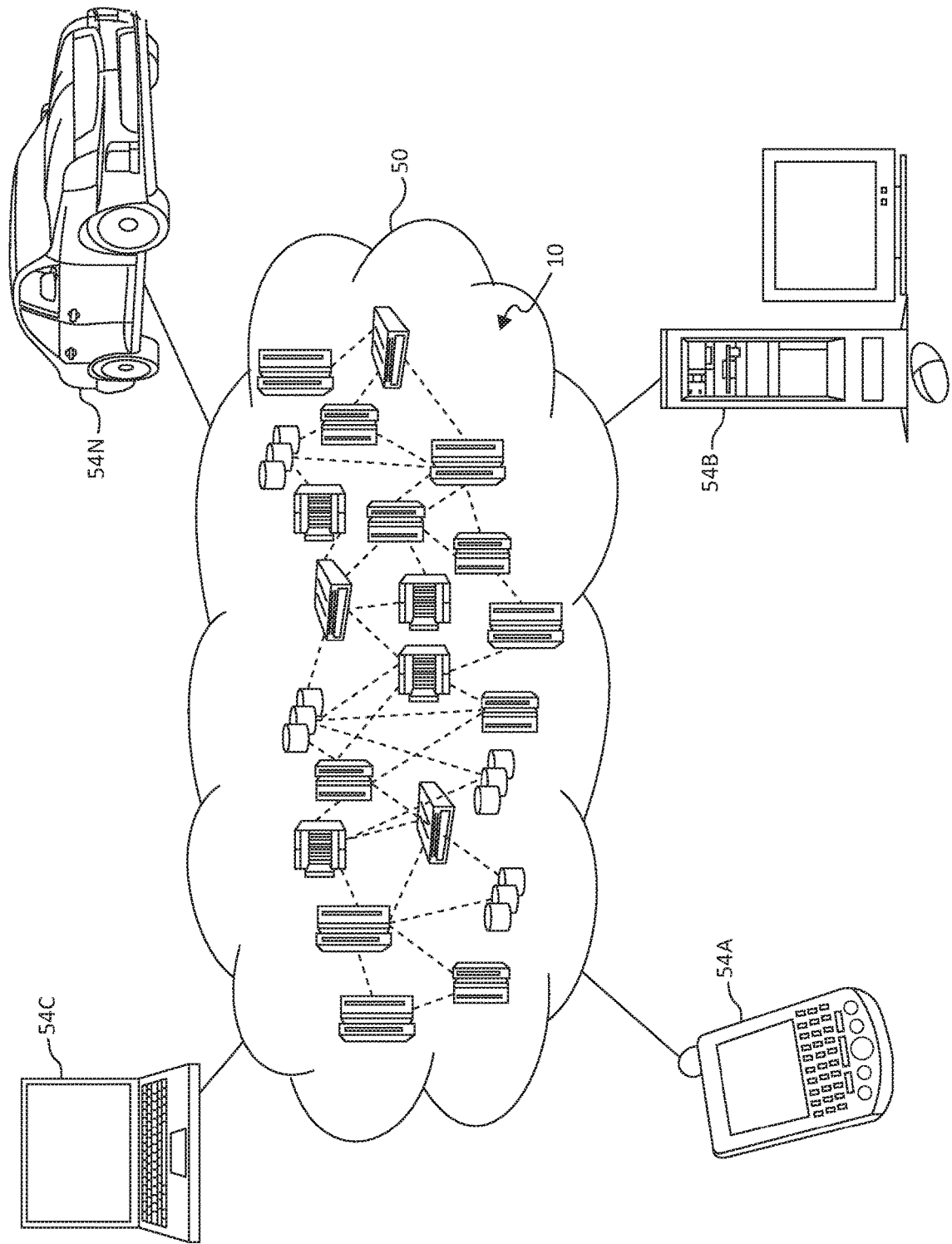
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
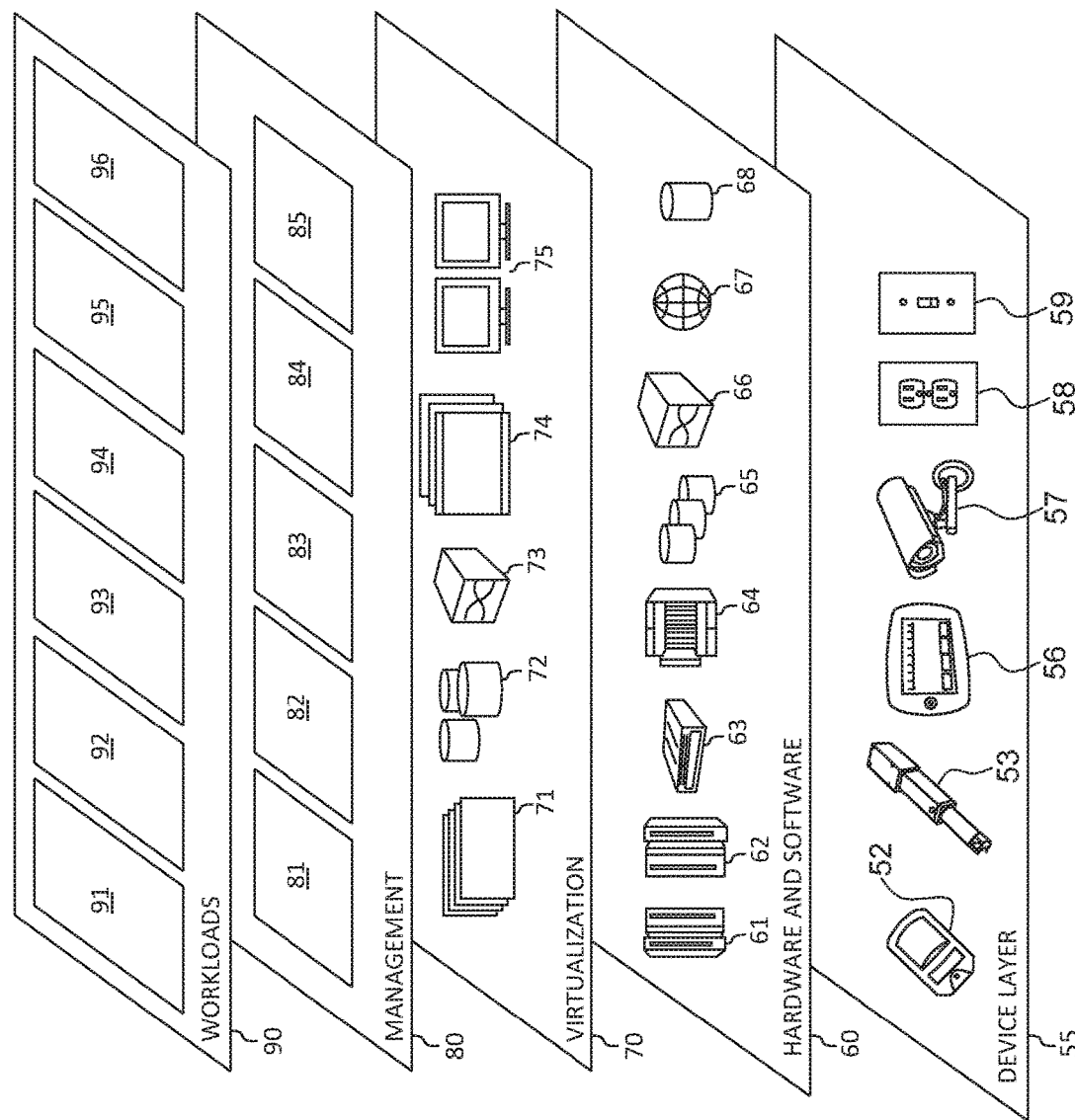
FIG. 3 is an additional block diagram depicting abstraction model layers according to an embodiment of the present invention.

Referring now to FIG. 3, a set of functional abstraction layers provided by cloud computing environment 50 (FIG.

2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for intelligent classification of regions of interest. In addition, workloads and functions 96 for intelligent classification of regions of interest may include such operations as data analysis, machine learning (e.g., artificial intelligence, natural language processing, etc.), user analysis, IoT sensor device detections, operation and/or analysis, as will be further described. One of ordinary skill in the art will appreciate that the workloads and functions 96 for intelligent classification of regions of interest may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the present invention provides a novel solution for intelligent classification of region of interest in an organism. In one embodiment, time series data of a contrast agent (e.g., a fluorescent dye) in one or more regions of interest captured from multispectral image streams may be collected. The one or more regions of interest may be classified into one of a plurality of classes by applying one or more perfusion models to one or more estimated perfusion parameters representing spatio-temporal behavior of the contrast agent during the time series data using a machine learning operation.

For example, as input data, video streams may be captured and provided by a multispectral medical imaging device to detect illumination of a contrast agent in the tissue. If desired, a user (e.g., patient) profile may be collected (e.g., age, weight, height, health conditions, historical data, nutrition patterns, health and fitness routines/habits, etc.). A corpus of historical video streams with associated classifier labels (e.g., medically relevant labels such as, for example, pathology findings) may be collected. Time series data may be collected with estimated perfusion parameters representing spatio-temporal behavior of the contrast agent during the time series data using a machine learning operation. The perfusion parameters may be applied to a classifier/perfusion model using a machine learning operation.

Processing the input data, one or more medically relevant labels (e.g., unhealthy tissue or healthy tissue) may be assigned based on applying the classifier/perfusion model. The labels classify each region of in the video input stream along with a corresponding confidence score assigned to each label to provide a real-time diagnostic result for each region.

Figure 4:
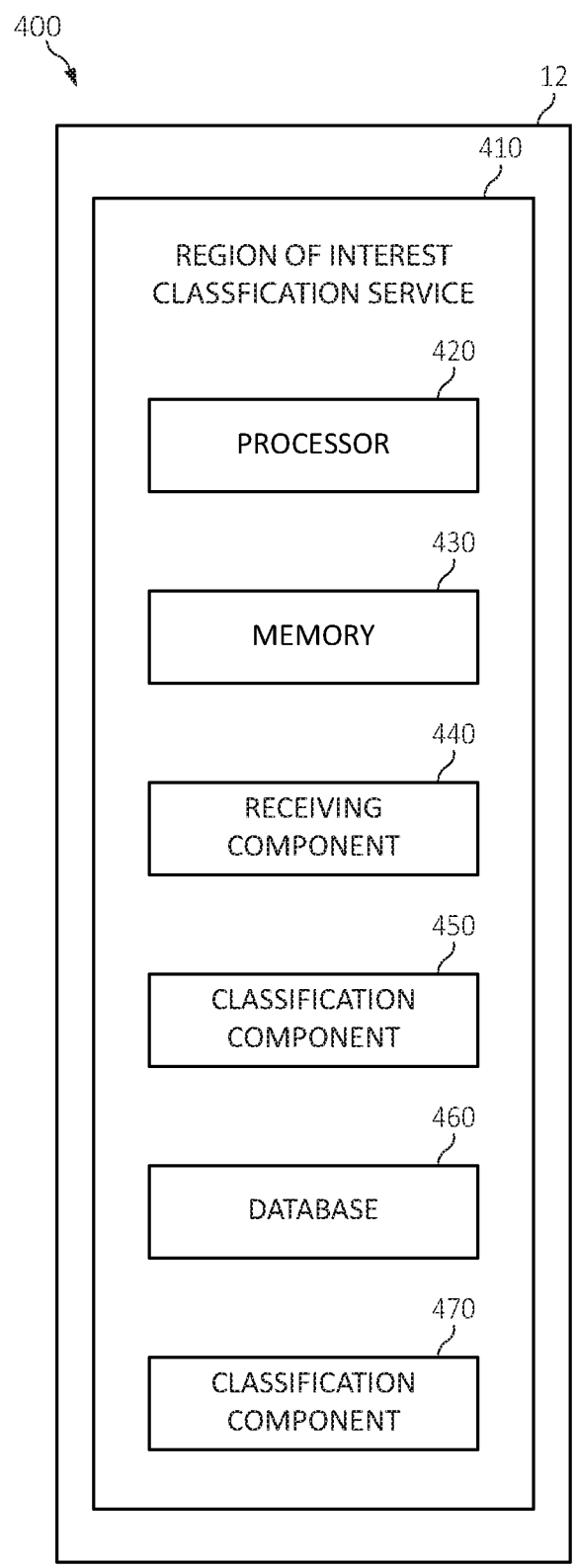
FIG. 4 is an additional block diagram depicting an exemplary functional relationship between various aspects of the present invention.

Turning now to FIG. 4, a block diagram depicting exemplary functional components 400 according to various mechanisms of the illustrated embodiments is shown. In one aspect, one or more of the components, modules, services, applications, and/or functions described in FIGS. 1-3 may be used in FIG. 4. A region of interest classification service 410 is shown, incorporating processing unit ("processor") 420 to perform various computational, data processing and other functionality in accordance with various aspects of the present invention. The region of interest classification service 410 may be provided by the computer system/server 12 of FIG. 1. The processing unit 420 may be in communication with memory 430. The region of interest classification service 410 may include a receiving component 440, a classification component 450, a database 460, and a machine learning model component 470.

As one of ordinary skill in the art will appreciate, the depiction of the various functional units in the region of interest classification service 410 is for purposes of illustration, as the functional units may be located within the region of interest classification service 410 or elsewhere within and/or between distributed computing components.

In one aspect, the region of interest classification service 410 may provide virtualized computing services (i.e., virtualized computing, virtualized storage, virtualized networking, etc.). More specifically, the region of interest classification service 410 may provide, and/or be included in, a virtualized computing, virtualized storage, virtualized networking and other virtualized services that are executing on a hardware substrate.

In one aspect, the receiving component 440 may receive one or more images/video streams from an image capturing device (e.g., multispectral image streams), a corpus of labels for labeling the multispectral image streams from database 460, user profile data, or a combination thereof. The receiving component 440 may receive the multispectral image streams of the one or more regions of interest for a selected period of time from an external computing device/image capturing device.

The classification component 450 may collect, document, and/or analyze time series data of a contrast agent in one or more regions of interest captured/received from the multispectral image streams. The classification component, in association with the machine learning model component 470 may identify an illumination intensity level of the contrast agent captured from the multispectral image stream. The illumination intensity level may represent spatio-temporal behavior and a concentration level of the contrast agent in the one or more regions of interest.

The classification component 450 classify the one or more regions of interest into one of a plurality of classes by applying one or more perfusion models to one or more estimated perfusion parameters representing spatio-temporal behavior of the contrast agent during the time series data using a machine learning operation. The classification component 450 may label and classify the regions of interest in the multispectral image streams. Each of the classes represents at least a predicted medical diagnosis of a region of interest. The classification component 450 may assign a confidence score to the one of the plurality of classes of the regions of interest.

The machine learning model component 470 may train or retrain the one or more perfusion models according to a repository of plurality of multispectral image streams associated with database 460. The machine learning model component 470 may learn, train, and/or analyze a corpus of labels of each of the multispectral image streams. The machine learning model component 470 may learn, analyze, process time series data, each labeled regions of interest, patient profile data, or a combination thereof.

In one embodiment, by way of example only, the machine learning model component 470 as used herein may include, for example, an instance of IBM® Watson® such as Watson® Analytics (IBM® and Watson® are trademarks of International Business Machines Corporation). By way of example only, the machine learning component 470 may determine one or more heuristics and machine learning based models using a wide variety of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural networks, Bayesian statistics, naive Bayes classifier, Bayesian network, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning described in this paragraph are known and are considered to be within the scope of this disclosure.

Figure 5:
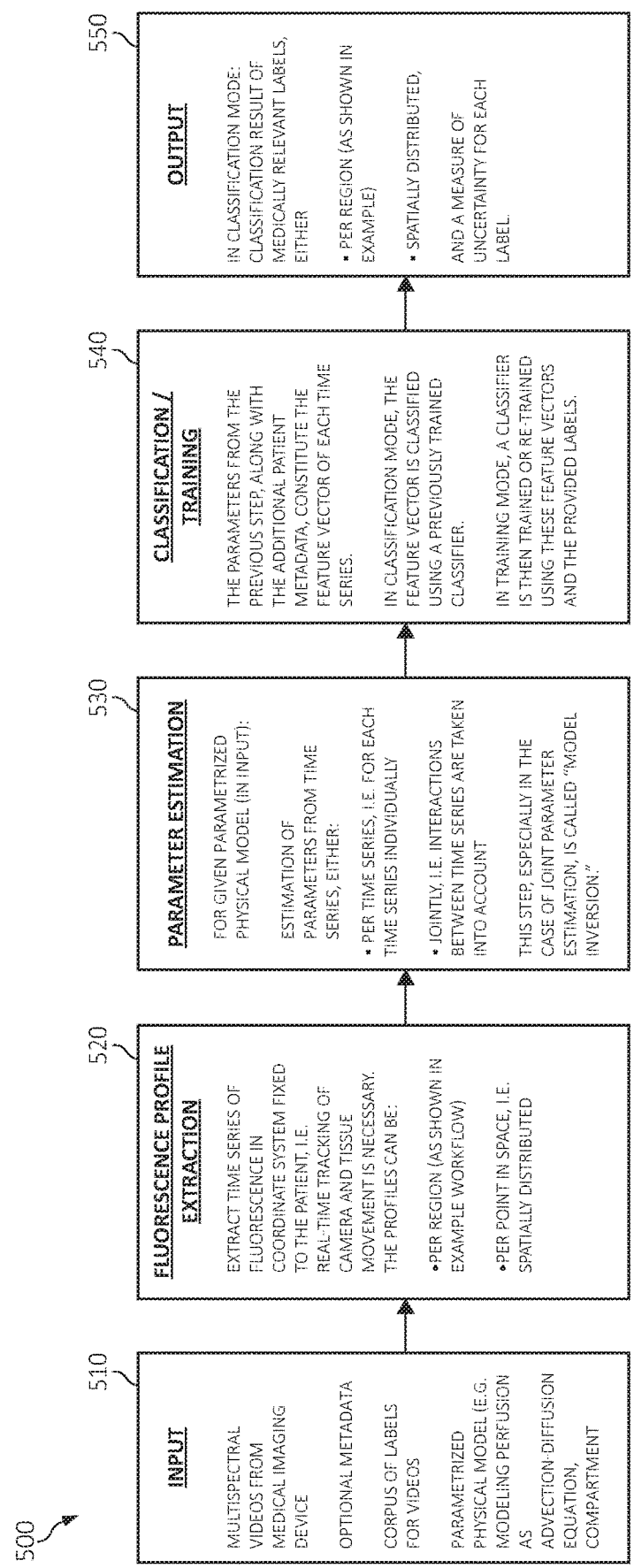
FIG. 5 is a block-flow diagram depicting intelligent classification of regions of interest in an organism from multispectral video streams using perfusion models in which aspects of the present invention may be realized.

Turning now to FIG. 5, block diagram of exemplary functionality 500 relating to intelligent classification of regions of interest in an organism from multispectral video streams using perfusion models is depicted according to various aspects of the present invention. As shown, the various blocks of functionality are depicted with arrows designating the blocks' 500 relationships with each other and to show process flow. Additionally, descriptive information is also seen relating each of the functional blocks 500. As will be seen, many of the functional blocks may also be considered "modules" of functionality, in the same descriptive sense as has been previously described in FIG. 1-4. In one aspect, one or more of the components, modules, services, applications, and/or functions described in FIGS. 1-4 may be used in FIG. 5. Repetitive description of like elements employed in other embodiments described herein (e.g., FIGS. 1-4) is omitted for sake of brevity.

With the foregoing in mind, the module blocks 500 may also be incorporated into various hardware and software components of a system for image enhancement in accordance with the present invention. Many of the functional blocks 500 may execute as background processes on various components, either in distributed computing components, or on the user device, or elsewhere, and generally unaware to the user performing generalized tasks.

Starting in block 510, input data may be received such as, for example, 1) multispectral videos (e.g., real-time streaming of multispectral videos) received from one or more medical imaging devices of a region of interest of an organism (e.g., a selected region of a patient's person receiving a medical imaging scan), 2) metadata (e.g., optionally receiving/using metadata of a patient) relating to one or more users (e.g., a user profile of the patient), 3) a corpus of labels for the multispectral videos, and/or 4) one or more parameterized physical models (e.g., modeling perfusion as advection-diffusion equations, compartment models, etc.).

In block 520, a contrast agent (e.g., fluorescent dye) profile extraction operation may be performed. That is, a time series of the fluorescence is being extracted since, for example, the process is quite involved—movements of camera and patient have to be compensated, and aggregation (e.g., computing an average brightness) over a region has to be performed. For example, time series data of fluorescent dye may be extracted from the multispectral videos in a coordinate system fixed to a user (e.g., the patient) (e.g., real-time tracking of an image capturing device/medical imaging device. Also, the contrast agent profile may be per selected region of interest and/or per point in space (e.g., spatially distributed). For example, in the current implementation, one or more regions of interest (e.g., rectangles such as, for example, rectangles 4, 5, and 6 on the video frame of block 640 of FIG. 6) may be selected and extract profiles only for those boxes (e.g., track the rectangles' location throughout the duration of the video and store the average brightness). So currently, there is one number per box per frame. In an additional aspect, each and every pixel in a video frame may be tracked (as compared to selected regions within a defined area such as those within the exemplary rectangles) and even perform three-dimensional ("3D") estimation, so that there would be one number per each location in space per frame, which would be "spatially distributed."

A one or more parameters of a physical model (e.g., a choice of physical parameterization) may be estimated, as in block 530. For a selected parameterized physical model (from the input), one or more parameters may be estimated from time series data per time series or jointly. The parametrized physical model may be a set of mathematical equations describing a physical phenomenon; the equations contain certain numbers, the parameters, which have a physical meaning. The parameters may include for example absorption coefficients, gravitational acceleration, reaction rates, etc. For example, physical parameters may be estimated from a brightness/illumination profile of the contrast agent in the region of interest. That is, one or more parametrized physical models may be selected for perfusion modeling such as, for example, advection-diffusion equations, compartment models, etc. The parameters may be estimated from the time series data either 1) per time series (e.g., for each time series individually), or 2) jointly (e.g., interaction between time series are taken into account). It should be noted that "individually" means that the present invention is estimating the parameters for each region of interest from only the data of this region of interest. That means that no interactions between the regions of interest are taken into account. "Jointly" means that the model does contain parameters which model the interaction between the regions of interest. This is especially important if the model is spatially distributed, i.e., for each time series there are time series for adjacent points in space.

In block 540, a classification/training operation may be performed using a machine learning operation. For example, one or more parameters, along with any additional user (e.g., patient) metadata, may constitute a feature vector (e.g., features are descriptors of things that need to be classified) of each time series. The descriptors are the parameters that have been estimated in, along with metadata such as, for example, the age, gender, etc., of the user (e.g., patient) whose tissue it is. The machine learning algorithm then makes its estimation based purely on the features. In the classification operation/mode, the feature vector representing each time series data may be classified using a previously trained classifier (e.g., using a machine learning operation). In a training operation/mode, the classifier may be trained or re-trained using these feature vectors and the provided labels. If there was one feature vector per region of interest, then now there is one classification result per region of interest. If the physical model was spatially distributed, then there is a feature vector per point in space, and hence there is also one classification result per point in space, so the classification result is spatially distributed. A "classification result" is a list of labels, and the confidence of the machine learning algorithm that each label applies.

In block 550, an output may be provided. That is, in the classification operation/mode, a classification result may be provided using medically relevant labels either 1) per region of interest and/or 2) spatially distributed. Also, an assigned confidence score (e.g., a measure of certainty or uncertainty) may be provided with each classification label of the region of interest of the organism.

Figure 6:
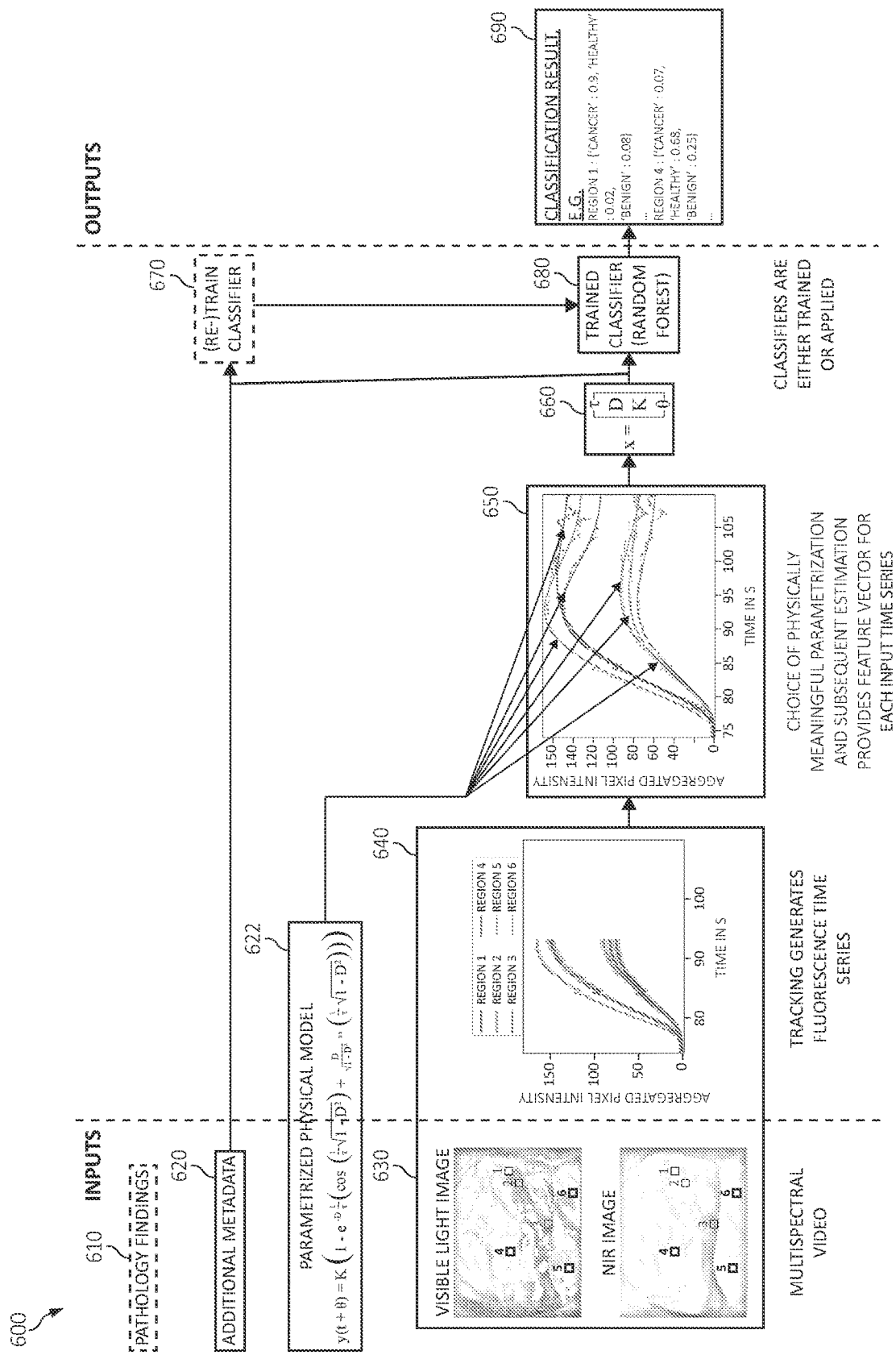
FIG. 6 is an additional diagram depicting intelligent classification of regions of interest in an organism from multispectral video streams using perfusion models in which aspects of the present invention may be realized.

Turning now to FIG. 6, diagram 600 depicts intelligent classification of regions of interest in an organism from multispectral image/video streams using perfusion models. As shown, the various blocks of functionality are depicted with arrows designating the blocks' 600 relationships with each other and to show process flow. Additionally, descriptive information is also seen relating each of the functional blocks 600. As will be seen, many of the functional blocks may also be considered "modules" of functionality, in the same descriptive sense as has been previously described in FIG. 1-4. In one aspect, one or more of the components, modules, services, applications, and/or functions described in FIGS. 1-4 may be used in FIG. 5.

In one aspect, one or more of the components, modules, services, applications, and/or functions described in FIGS. 1-5 may be used in FIG. 6. Repetitive description of like elements employed in other embodiments described herein (e.g., FIGS. 1-6) is omitted for sake of brevity.

Starting in block 630, multispectral video of one or more targeted regions (e.g., regions 1-6) may be imaged, scanned, and/or streamed using an image capturing devices. The targeted regions may be tracked (as illustrated in the small boxes on the video images of block 630), as in block 640. Thus, the tracked targeted regions generate fluorescence time series data as show in the graph of block 640 and 650 where time "t" is measured in seconds along an X-axis and an aggregated pixel intensity (e.g., average brightness-intensity level) being depicted for each region on a Y-axis. That is, for each frame of the multispectral video a point along the X-axis and Y-axis may be captured and marked as time series data. The point represents the brightness/illumination of the contrast agent.

It should be noted, in relation to tracking the targeted regions, the subject (e.g., a body part being imaged) may not be immobilized, and video processing needs to compensate for patient and camera movement as well as occasional occlusions.

From the values of the time series data, one or more coefficients of an equation (e.g., equation 1 below) or parameters may be estimated and/or inferred from the time series data of graph 650 (e.g., a set of physical parameters that may be extracted from the time series data curve in block 650). Said differently, one or more physical parameters may be selected and estimated of one or more perfusion models for feature vector representation/generation (e.g., physically meaningful parameterization and subsequent estimation provides for feature vector generation of graph 650). That is, a concentration of a contrast agent (e.g., a fluorescent dye) that has previously been injected into the region of interest (e.g., tissue) influences the optical properties of the video in a complex way, and the optical properties, in turn, may be extracted from the image captured by the camera sensors by estimating the parameters of a parametrized model equation 622 such as, for example:

$$\gamma(t+\theta) = K\left(1 - e^{-D\frac{t}{\tau}}\left(\cos\left(\frac{t}{\tau}\sqrt{1-D^2}\right) + \frac{D}{\sqrt{1-D^2}}\sin\left(\frac{t}{\tau}\sqrt{1-D^2}\right)\right)\right), \quad (1)$$

where t represents time and variables $\tau$, D, K, and $\theta$ may represent physical parameters (e.g., time delay, gain, damping, constant, etc.) and be selected and represent a physical parameterization of temporal behavior of a contrast agent. The parameters represent one or more abstract coefficients in this example, but they are known as time constant, damping, gain, and time delay, respectively. The physical parameterization may be used to estimate temporal behavior of the contrast agent and may subsequently be estimated to provide a feature vector for each input series. Thus, once the spatio-temporal evolutions of contrast agent concentrations have been estimated, all measured and estimated parameters may be used to define features for a classification operation.

Thus, the physical parameters will have different values for each of the time series data of each region of interest. Thus, each region of interest will have identifiable patterns based on the physical parameters inferred based on the brightness profile of the contrast agent in each region of interest. For example, all unhealthy tissue in each region (e.g., regions 1-6) may have similar patterns in the region of interest for the parameters. Alternatively, all of the healthy tissue in each of the regions may have similar patterns to each other in the region of interest for the parameters. That is, healthy tissue in each region will each have the same patterns but different than those regions of interest that contain unhealthy tissue.

The trained classifier may be applied to the measured and estimated parameters, as in block 680. (Also, the measured and estimated parameters, a user profile/metadata 620, and one or more historical results of similar regions of interest (e.g., pathology findings) may be used to retrain the trained classifier, as in block 670.

Each region of interest may be classified using a label on the region of interest (e.g., tissue of an organism) while also scoring each area of tissue in one or more dimensions such as, for example, a probability of malignancy, a quality of blood supply, homogeneity of the contrast agent uptake, and the like all of which may be a biophysical inverse problem and data-driven operations of biophysics-based AI. For example, a classified label for region 1 may indicate a 90% confidence score that the tissue is healthy and 10% confidence score that the tissue is unhealthy. A classified label for region 2 may indicate a 60% confidence score that the tissue is healthy and 40% confidence score that the tissue is unhealthy.

Figure 7:
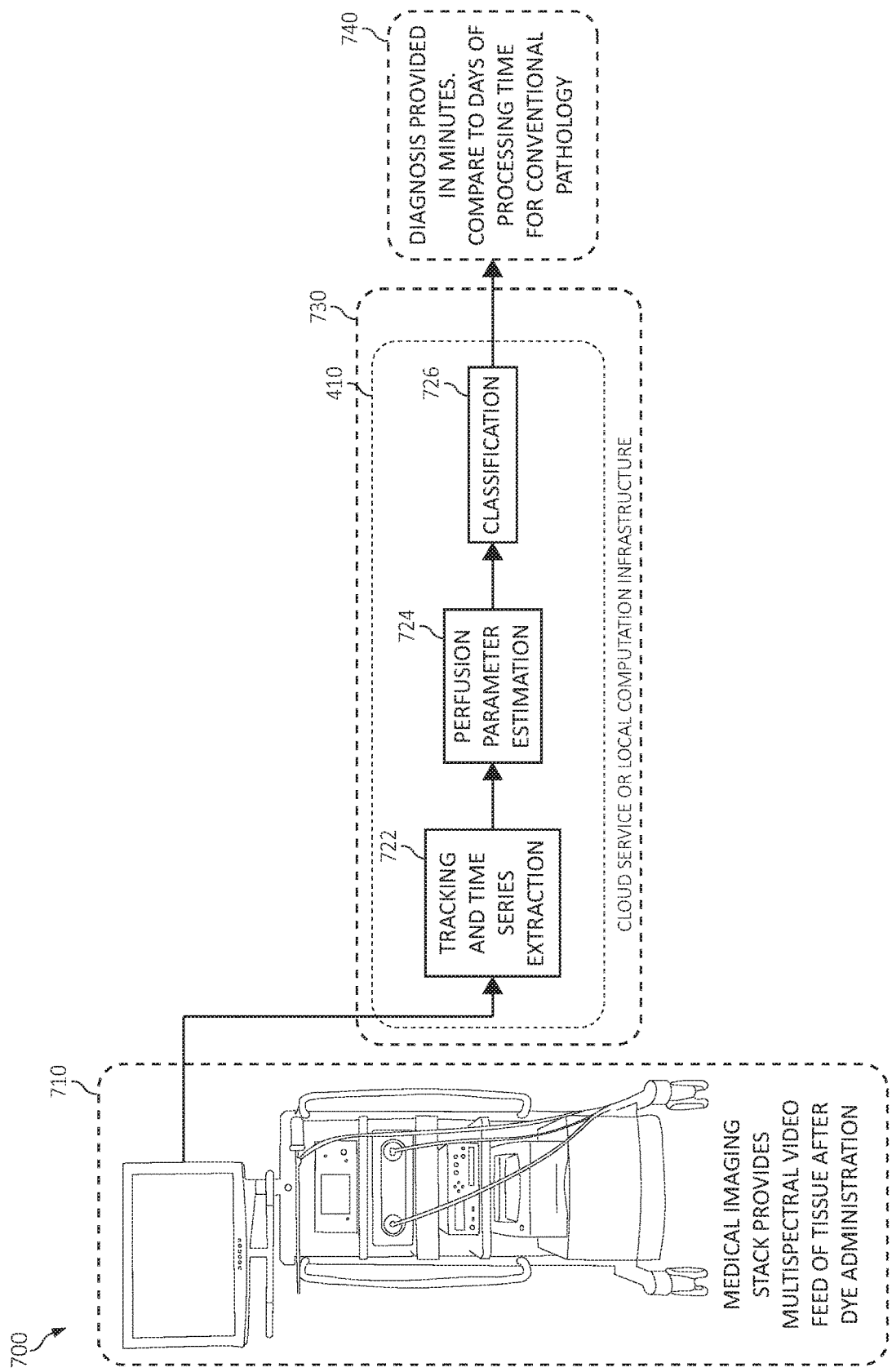
FIG. 7 is a diagram depicting real-time classification of regions of interest in an organism from multispectral video streams in a surgical operation setting in which aspects of the present invention may be realized.

Turning now to FIG. 7, diagram 700 depicts real-time classification of regions of interest in an organism from multispectral video streams in a surgical operation setting. In one aspect, one or more of the components, modules, services, applications, and/or functions described in FIGS. 1-6 may be used in FIG. 7. Repetitive description of like elements employed in other embodiments described herein (e.g., FIGS. 1-6) is omitted for sake of brevity.

As depicted, the interest classification service 410 of FIG. 4 may be in communication with a medical imaging stack imaging device 710. The interest classification service 410 may be provided in a computer system 730, which may be a cloud computing system or local computer system/computation infrastructure.

The medical imaging stack imaging device 710 may provide multispectral video feed (e.g., in real time) of a region of interest (e.g., human tissue) after a contrast agent (e.g., a fluorescent dye) has been administered (e.g., contrast agent not being directly injected into the region of interest but to some injected region of the subject such as, for example, in an arm of the patient) Time series data of the contrast agent may be tracked and extracted in the multispectral video feed, as in block 722. One or more perfusion parameters may be estimated from the time series data (e.g., fluorescent time series data) representing the temporal behavior of the contrast agent, as in block 724. For example, the time series data represent a degree of pixel change or illumination intensity level of the contrast agent captured in the multispectral image stream. The illumination intensity level may represent a concentration level of the contrast agent in the regions of interest.

The perfusion parameters may then be applied in a perfusion model or "classifier" to provide a classification of the region of interest (e.g., human tissue) immediately after (e.g., within seconds or minutes) receiving the multispectral video feed (e.g., in real time), as in block 726. The classification of the region of interest (e.g., human tissue) may be labeled as healthy or unhealthy.

In block 740, a diagnosis may be provided within a selected time period (e.g., within minutes), which is an advantage over the current state of the art which requires days for processing time for conventional pathological finding/results.

Figure 8:
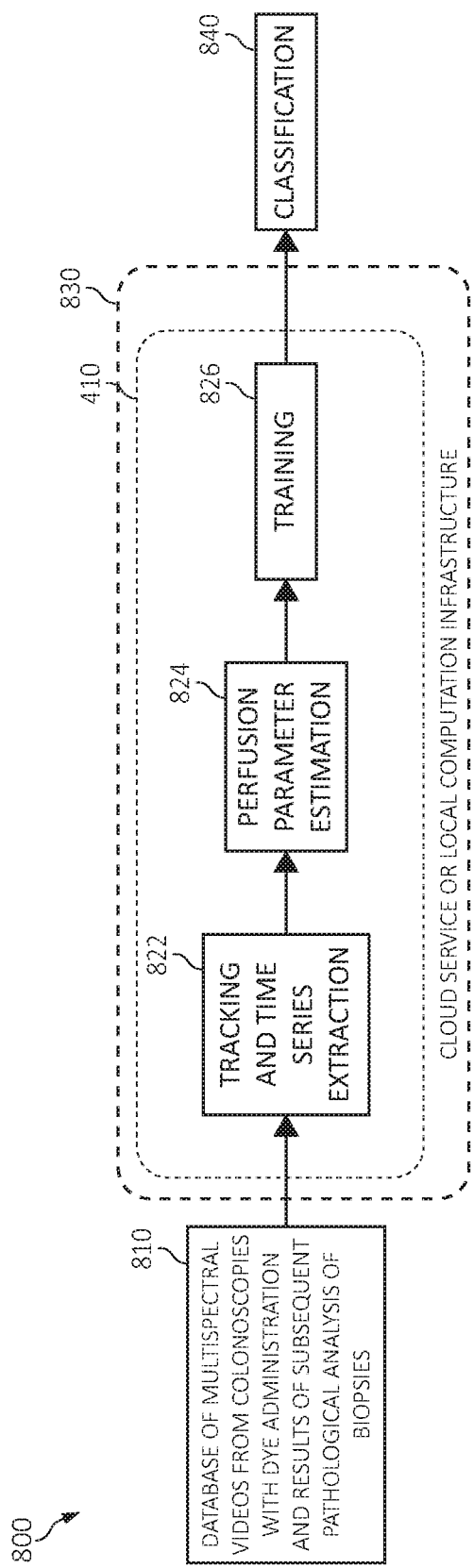
FIG. 8 is a diagram depicting training a classifier for classification of regions of interest in an organism from multispectral video streams in a surgical operation setting in which aspects of the present invention may be realized.

FIG. 8 is a diagram depicting training a classifier for classification of regions of interest in an organism from multispectral video streams in a surgical operation setting. In one aspect, one or more of the components, modules, services, applications, and/or functions described in FIGS. 1-7 may be used in FIG. 8. Repetitive description of like elements employed in other embodiments described herein (e.g., FIGS. 1-7) is omitted for sake of brevity.

As depicted, the interest classification service 410 of FIG. 4 may be in communication with database 810. In one aspect, the database 810 may be database 460 of FIG. 4 and may be internally located with the region of interest classification service 410. Alternatively, database 810 may be located externally to the region of interest classification service 410. The region of interest classification service 410 classification service 410 may be provided in a computer system 830, which may be a cloud computing system or local computer system/computation infrastructure.

The database 810 may include and provide one or more multispectral videos (e.g., from surgical procedures/medical exams using an image capturing device) with a contrast agent (e.g., a fluorescent dye) administered to the region of interest and results obtained from subsequent pathological analysis of biopsies. Using this data from database 810, time series data of the contrast agent may be tracked and extracted from the data from database, as in block 822. One or more perfusion parameters may be estimated from the time series data (e.g., fluorescent time series data) representing the temporal behavior of the contrast agent, as in block 824. For example, the time series data represent a degree of pixel change or illumination intensity level of the contrast agent captured in the multispectral image stream.

The illumination intensity level may represent a concentration level of the contrast agent in the regions of interest.

The perfusion parameters may then be used for training one or more machine learning models or "classifiers." The training and learning operations may produce a classifier enabled to classify one or more regions of interest (e.g., human tissue) immediately after (e.g., within seconds or minutes) receiving the multispectral video feed (e.g., in real time), as in block 840. The classifier may be used to label the region of interest (e.g., human tissue) as healthy or unhealthy. In this way, the classifier and labels provide a real-time diagnosis within a selected time period (e.g., within minutes), which is an advantage over the current state of the art which requires days for processing time for conventional pathological finding/results.

Figure 9:
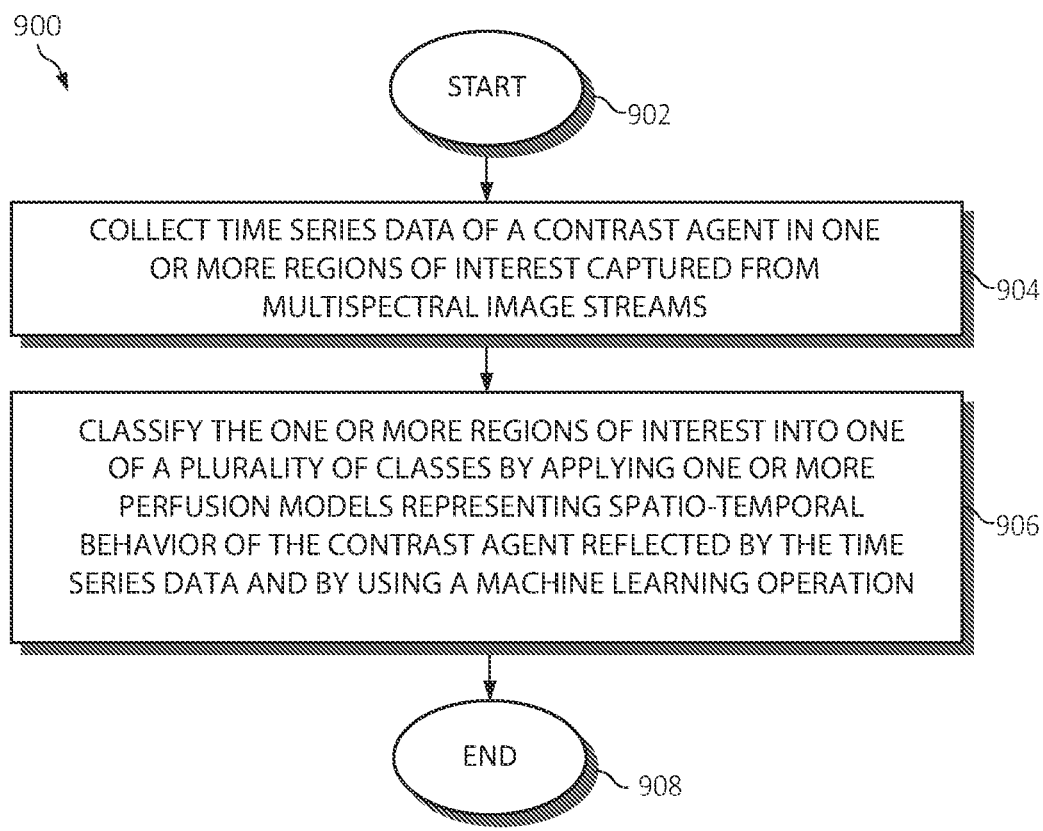
FIG. 9 is a flowchart diagram depicting an additional exemplary method for implementing intelligent classification of regions of interest in an organism from multispectral video streams using perfusion models by a processor, again in which aspects of the present invention may be realized.

Turning now to FIG. 9, an additional method 900 for implementing intelligent classification of region of interest in an organism is depicted, in which various aspects of the illustrated embodiments may be implemented. The functionality 900 may be implemented as a method executed as instructions on a machine, where the instructions are included on at least one computer readable medium or on a non-transitory machine-readable storage medium. The functionality 900 may start in block 902.

Time series data of a contrast agent in one or more regions of interest captured from multispectral image streams may be collected, as in block 904. The one or more regions of interest may be classified into one of a plurality of classes by applying one or more perfusion models, representing spatio-temporal behavior of the contrast agent reflected by the time series data, and by using a machine learning operation, as in block 906. Machine learning may be used for the classifying and applying in block 906. The functionality 900 may end in block 908.

In one aspect, in conjunction with and/or as part of at least one block of FIG. 9, the operations of method 900 may include each of the following. The operations of method 900 may capture the multispectral image streams of the one or more regions of interest for a selected period of time the image capturing device. The operations of method 900 may collect user profile data, and/or collect a corpus of labels for labeling the multispectral image streams.

The operations of method 900 may label the one of the plurality of classes of the regions of interest in the multispectral image streams, wherein the one of the plurality of classes represents at least a predicted medical diagnosis of the region of interest and assign a confidence score to the one of the plurality of classes of the regions of interest.

The operations of method 900 may identify an illumination intensity level of the contrast agent captured from the multispectral image stream, wherein the temporal behavior includes the illumination intensity level and the illumination intensity level represents a concentration level of the contrast agent in the one or more regions of interest. The operations of method 900 may initiate a machine learning to perform one or more machine learning operations to train or retrain the one or more perfusion models according to a repository of plurality of multispectral image streams, a corpus of labels of each of the plurality of multispectral image streams, a plurality of time series data, labeled regions of interest, patient profile data, or a combination thereof.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for implementing intelligent classification of regions of interest of an organism by a processor, comprising:
    collecting time series data of a contrast agent, injected into a patient and perfusing through one or more regions of interest, from multispectral image streams;
    classifying the one or more regions of interest into one of a plurality of classes by using a machine learning operation to apply one or more perfusion models representing spatio-temporal behavior of the contrast agent reflected by the time series data, wherein the classification is performed by the machine learning operation in real-time and eliminates a waiting period, from injection to a stationary phase in which the contrast agent is persisted or flushed from the one or more regions of interest, otherwise required to perform a medical diagnosis.

2. The method of claim 1, further including estimating one or more parameters of the one or more perfusion models for classifying the one or more regions of interest.

3. The method of claim 1, further including:
    receiving, in real-time, the multispectral image streams of the one or more regions of interest for a selected period of time from an image capturing device;
    collecting user profile data; or
    collecting a corpus of labels for labeling the multispectral image streams.

4. The method of claim 1, further including labeling the one of the plurality of classes of the one or more regions of interest in the multispectral image streams, wherein the one of the plurality of classes represents at least a predicted medical diagnosis of the one or more regions of interest.

5. The method of claim 1, further including assigning a confidence score to the one of the plurality of classes of the one or more regions of interest.

6. The method of claim 1, further including identifying a fluorescence intensity level of the contrast agent captured from the multispectral image streams, wherein the spatio-temporal behavior includes the fluorescence intensity level and the fluorescence intensity level represents a concentration level of the contrast agent in the one or more regions of interest.

7. The method of claim 1, further including initiating the machine learning operation to train or retrain the one or more perfusion models according to a repository of plurality of multispectral image streams, a corpus of classes or labels of each of the plurality of multispectral image streams, a plurality of time series data, labeled regions of interest, patient profile data, or a combination thereof.

8. A system for implementing intelligent classification of region of interest of an organism, comprising:
    one or more computers with executable instructions that when executed cause the system to:
        collect time series data of a contrast agent, injected into a patient and perfusing through one or more regions of interest, from multispectral image streams;
        classify the one or more regions of interest into one of a plurality of classes by using a machine learning operation to apply one or more perfusion models representing spatio-temporal behavior of the contrast agent reflected by the time series data wherein the classification is performed by the machine learning operation in real-time and eliminates a waiting period, from injection to a stationary phase in which the contrast agent is persisted or flushed from the one or more regions of interest, otherwise required to perform a medical diagnosis.

9. The system of claim 8, wherein the executable instructions further estimate one or more parameters of the one or more perfusion models for classifying the one or more regions of interest.

10. The system of claim 8, wherein the executable instructions further:
    receive, in real-time, the multispectral image streams of the one or more regions of interest for a selected period of time from an image capturing device;

collect user profile data; or collect a corpus of labels for labeling the multispectral image streams.

11. The system of claim 8, wherein the executable instructions further label the one of the plurality of classes of the one or more regions of interest in the multispectral image streams, wherein the one of the plurality of classes represents at least a predicted medical diagnosis of the one or more regions of interest.

12. The system of claim 8, wherein the executable instructions further assign a confidence score to the one of the plurality of classes of the one or more regions of interest.

13. The system of claim 8, wherein the executable instructions further identify a fluorescence intensity level of the contrast agent captured from the multispectral image streams, wherein the spatio-temporal behavior includes the fluorescence intensity level and the fluorescence intensity level represents a concentration level of the contrast agent in the one or more one or more regions of interest.

14. The system of claim 8, wherein the executable instructions further initiate the machine learning operation to train or retrain the one or more perfusion models according to a repository of a plurality of multispectral image streams, a corpus of labels of each of the plurality of multispectral image streams, a plurality of time series data, labeled regions of interest, patient profile data, or a combination thereof.

15. A computer program product for implementing intelligent classification of region of interest of an organism by a processor, the computer program product comprising a non-transitory computer-readable storage medium having computer-readable program code portions stored therein, the computer-readable program code portions comprising:

an executable portion that collects time series data of a contrast agent, injected into a patient and perfusing through one or more regions of interest, from multispectral image streams;

an executable portion that classifies the one or more regions of interest into one of a plurality of classes by using a machine learning operation to apply one or more perfusion models representing spatio-temporal behavior of the contrast agent reflected by the time series data, wherein the classification is performed by the machine learning operation in real-time and eliminates a waiting period, from injection to a stationary phase in which the contrast agent is persisted or flushed from the one or more regions of interest, otherwise required to perform a medical diagnosis.

16. The computer program product of claim 15, further including an executable portion that estimates one or more parameters of the one or more perfusion models for classifying the one or more regions of interest.

17. The computer program product of claim 15, further including an executable portion that:

receives, in real-time, the multispectral image streams of the one or more regions of interest for a selected period of time from an image capturing device;

collects user profile data; or collects a corpus of labels for labeling the multispectral image streams.

18. The computer program product of claim 15, further including an executable portion that:

labels the one of the plurality of classes of the one or more regions of interest in the multispectral image streams, wherein the one of the plurality of classes represents at least a predicted medical diagnosis of the one or more regions of interest; and assigns a confidence score to the one of the plurality of classes of the one or more regions of interest.

19. The computer program product of claim 15, further including an executable portion that a fluorescence intensity level of the contrast agent captured from the multispectral image streams, wherein the spatio-temporal behavior includes the fluorescence intensity level and the fluorescence intensity level represents a concentration level of the contrast agent in the one or more regions of interest.

20. The computer program product of claim 15, further including an executable portion that initiates the machine learning operation to train or retrain the one or more perfusion models according to a repository of plurality of multispectral image streams, a corpus of labels of each of the plurality of multispectral image streams, a plurality of time series data, labeled regions of interest, patient profile data, or a combination thereof.

* * * * *